(12) United States Patent
Vihinen

(10) Patent No.: US 8,484,128 B2
(45) Date of Patent: Jul. 9, 2013

(54) METHOD OF IMPLEMENTING DIGITAL PAYMENTS

(75) Inventor: Seppo Vihinen, Vantaa (FI)

(73) Assignee: Intellectual Ventures I LLC, Wilmington, DE (US)

( * ) Notice: Subject to any disclaimer, the term of this patent is extended or adjusted under 35 U.S.C. 154(b) by 907 days.

(21) Appl. No.: 10/288,091

(22) Filed: Nov. 5, 2002

(65) Prior Publication Data

US 2003/0126078 A1 Jul. 3, 2003

(30) Foreign Application Priority Data

May 5, 2000 (FI) ...................................... 20001054

(51) Int. Cl.
*G06Q 40/00* (2012.01)
(52) U.S. Cl.
USPC .................................. 705/39; 705/14; 705/53
(58) Field of Classification Search
USPC ... 705/14, 17, 39, 40, 42, 67–78, 53; 713/201
See application file for complete search history.

(56) References Cited

U.S. PATENT DOCUMENTS

| | | | |
|---|---|---|---|
| 5,903,880 A | 5/1999 | Biffer | |
| 6,085,168 A * | 7/2000 | Mori et al. | 705/17 |
| 6,205,437 B1 * | 3/2001 | Gifford | 705/75 |
| 6,363,488 B1 * | 3/2002 | Ginter et al. | 726/1 |
| 2002/0029189 A1 * | 3/2002 | Titus et al. | 705/39 |

FOREIGN PATENT DOCUMENTS

| | | |
|---|---|---|
| EP | 0 986 275 A1 | 3/2000 |
| WO | WO 96/13814 | 5/1996 |
| WO | WO 98/42173 | 10/1998 |
| WO | WO 98/47116 | 10/1998 |
| WO | WO 99/16029 | 4/1999 |
| WO | WO 00/00918 | 1/2000 |
| WO | WO 00/63809 | 10/2000 |

OTHER PUBLICATIONS

John Downes and Jordan Elliot Goodman, Financial Guides, Dictionary of Finance and Investment Terms, 1998, Barron, Fifth Ed., p. 130.*

* cited by examiner

*Primary Examiner* — Siegfried E Chencinski

(57) ABSTRACT

A method for transferring a digital payment order from a first terminal device to a second terminal device, and for saving the payment order on a payment order server. A payment order request is sent from the first terminal device to the payment order server and, in response, the requested payment order is sent from the payment order server to the first terminal device. The payment order is thereafter transmitted from the first terminal device to the second terminal device, and the payment order is then transferred from the second terminal device to the payment order server to be honored. A message confirming the honoring of the payment order is sent to the second terminal device.

19 Claims, 3 Drawing Sheets

| I request |
|---|
| a payment |
| order for |
| 200 euros |

Fig. 3a

| This is | | ID: 123 |
|---|---|---|
| a payment | | 456789123 |
| order for | | 456789123 |
| 200 euros | | 4567891 |

Fig. 3b

| This is | Sender: | Cash |
|---|---|---|
| a payment | 040- 123 456 | the payment |
| order for | 789 | order by |
| 200 euros | | sending it to |

| number | ID: 123 |
|---|---|
| 13579 or | 456789123 |
| by phoning | 456789123 |
| 0200-12345 | 4567891 |

Fig. 3c

METHOD OF IMPLEMENTING DIGITAL PAYMENTS

BACKGROUND OF THE INVENTION

1. Field of the Invention

The present invention relates generally to telecommunication systems. The invention is more particularly directed to the transmission of payment orders in a mobile communication system.

2. Description of Related Art

The arranging of services based on short messages has become and continues to be increasingly common. The transmission of short messages is particularly easy for users of mobile stations that are a part of a GSM (Global System for Mobile Communications) telecommunication network in which a short messaging service is typically implemented.

The short message service permits a user to send, between mobile stations, short text messages that generally contain up to 160 characters. Transmission of short messages does not require that the recipient mobile station be switched on; if the intended recipient mobile station cannot be reached at the time that the message is sent, the message is saved by the short message service center for a period of at least several days. When the intended recipient mobile station is thereafter activated in the area or range of the mobile network, the message is transmitted to the now-active mobile station. Messages can be transmitted between mobile stations that are present either in the coverage area of the same cell or in different cells using the roaming feature of the mobile station. Short messages can also be transmitted to other devices, such as digital telephones or e-mail terminals or receivers.

Short messages permit the implementation of numerous and diverse services. Typically, the user of a mobile station sends a short message to a service provider that reads the short message and implements a service that is requested or indicated by the message, such as a transfer to the requesting user of balance data for the user's mobile telephone bill.

In the banking world, currency is commonly transferred between individuals and/or entities or accounts by means of a payment order, as for example a paper check. To effect such a transfer of currency, a client will order or request from the bank a check that includes identifying details of the sender and the recipient and the amount of the currency to be transferred. Upon receipt of the check, the client further sends the check to the intended recipient, who then cashes the check in a bank. Such currency transfers by check are accordingly often slow and cumbersome, since the writing or preparation of a check and the subsequent deposit or cashing of the check takes time and generally requires that the client physically visit a bank.

There are today significant problems in ordering or implementing the transmission of a payment order via a telecommunication network. Such networks, by way of particular example the Internet, are unusually subject to the possibility of cracking. To effect the transfer of currency in a telecommunication network it is therefore essential that the information security of the client be assured so that the payment order information does not end up in the hands of unintended third parties. It is further important to assure that the payment order information does not change—i.e. that it remains the same as it is transmitted from the sender to the intended recipient—to prevent attempts at misuse. The rapidity with which typical currency transfers take place in telecommunication networks raises the danger that a user is insufficiently well informed of the obligations connected or associated with a payment order.

In one heretofore known solution for implementing network-based currency transfer, the so-called Solo service, a mobile station user has a client identifier and a list of single-use passwords with which the user exercises remotely-effected control over the user's bank account, as for example to pay bills. A serious disadvantage of the Solo service, however, is that the mobile station user is responsible for and must accordingly exercise extreme caution to assure that the user's single-use passwords not end up in the wrong hands.

OBJECTS AND SUMMARY OF THE INVENTION

It is accordingly the desideratum of the present invention to eliminate, or at least alleviate, the drawbacks and deficiencies of prior art methods and arrangements, as for example those discussed hereinabove, for effecting the transfer of currency payments using a mobile communication system.

It is a particular object of the invention to provide an advantageously simple and straightforward method for transferring digital payment orders from a payment order server to client mobile stations that typically have a restricted amount of memory and calculation capability.

In meeting these objectives, the invention permits rapid and easily-realized transmission of a digital payment order from the sender to the intended recipient.

The present invention is most particularly directed to a method in which a sending mobile station user first acquires a payment order in the user's terminal device. To do so, the mobile station user sends a request for a payment order, as for example by transferring or depositing or ordering a specified or otherwise suitable amount of currency into an account attached to or associated with a payment order service. When crediting of the intended account has been registered, an informational message relating to the transaction is sent to the payment order server. The payment order server views the crediting of the account as an instruction for a payment order, and accordingly sends the requested payment order to the mobile station of the sender. The payment order server will generally maintain a database of payment orders. The mobile station user then further transfers the payment order to the intended recipient of the payment order, either immediately following the user's receipt of the payment order or within a predetermined or specified period of time. When the intended recipient of the payment order has received the payment order, the recipient honors the received payment order by sending the payment order to the payment order server. The payment order server thereby receives and then honors the payment order, as by crediting the account of the intended recipient if the account details of the recipient have been provided in the payment order message.

In some cases it is useful to follow the steps in processing the payment order, for which purpose one or a series of checking and confirmation messages may be employed. Where deemed desirable or appropriate to provide confirmation of the intended payment order, a confirmation message is sent to the sending mobile user's terminal device before transmitting the payment order to the intended recipient. A reply to the confirmation message from the sending user is then required to indicate the user's acceptance of the payment order. A message informing of the account transaction is sent to the terminal device of the sending user after the terminal device has received the payment order. The confirmation message is sent when the payment order has been transmitted to the intended recipient but has not yet been honored. The confirmation message may moreover be sent both to the sender of the payment order and to the intended recipient of the payment order when the intended recipient has honored the payment order. Additionally, a reminder may be sent to the mobile station user shortly before expiration of the period of validity specified in the payment order; the payment order is automatically cancelled when the specified period of validity expires, in which case a message stating that the payment order has been cancelled is sent to the sender and to the intended recipient of the payment order.

A payment order, which is typically implemented as a digital message, is understood to denote a payment procedure in which currency in accordance with the value of the payment order is transferred from the sender to the intended recipient. The payment order often includes data that identifies of the value of the payment order, the name of the sender, the mobile number of the sender, instructions for honoring the payment order, and an identifier. Identification of the time of creation of the payment order, of the number of confirmation messages to be sent, of the period of validity, of the method of destruction of the payment order if it is not honoured within the period of validity, and of the mobile number of the recipient, may also be attached to or included in the payment order.

In one embodiment of the invention, the digital payment order is transmitted in a mobile communication system. In that embodiment a first mobile station initially orders or requests a payment order from the payment order server, which in response to the request delivers the requested payment order to the first mobile station. The first mobile station then sends the received payment order to a second mobile station which, upon its receipt of the payment order, further sends the payment order to the payment order server to be honored.

As compared to prior art systems and arrangements, the present invention advantageously provides delivery of the payment order as a short message, thereby permitting rapid and ready transmission of the payment order between different banks without requiring that the sender and intended recipient both maintain an account with the same bank. The payment order is transmitted as secure data, for example because the radio transmissions and traffic pathways of GSM systems are encrypted. In addition, in accordance with the invention a transfer entry is logged to record the transfer of the payment order, thereby facilitating dynamic monitoring and reviewability of the steps involved in the progress and processing of the payment order and rendering it notably more difficult to copy and/or forge a payment order. A number or other identifier, as for example consisting of a series of letters, may furthermore be attached to or included in the payment order for improved accuracy in uniquely identifying a payment order, thus enhancing the difficulty of accomplishing a successful forgery. Theft of a mobile station to thereby fraudulently obtain a payment order is useless because the recipient honors the payment order immediately. The payment order is also transmitted quickly since information transmission in a telecommunication network is effected at high speeds and without delay. From the viewpoint of the bank, the inventive method is particularly advantageous because, with the payment order being in the possession of the client, the corresponding currency remains interest-free at the disposal of the bank. On the other hand, the invention also decreases the amount of cash currency that needs to be exchanged or transferred, thereby decreasing the number of required cash dispensers which are expensive to maintain but are normally provided to a bank's customers as a free service. Finally, the client can receive checking and confirmation messages relating to the transfer of the payment order, thus keeping the client well informed of the steps involved with processing and honoring of the payment order.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings:

FIGS. 3a, 3b and 3c depict information displayed on the screens of mobile stations in an application implemented in accordance with the invention.

DETAILED DESCRIPTION OF THE CURRENTLY PREFERRED EMBODIMENTS

Figure 1:
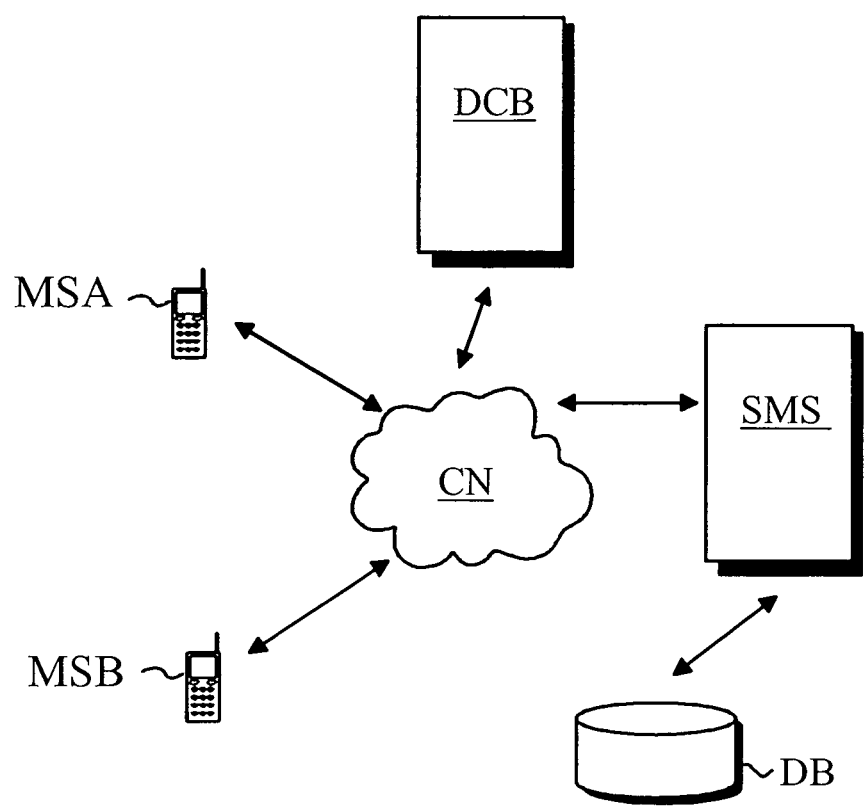
FIG. 1 is a diagrammatic block diagram of system arrangement in accordance with the present invention.

FIG. 1 diagrammatically depicts a block diagram of a system in accordance with the invention. A first mobile station MSA is connected via a telecommunication network CN to a short message service center in which a payment order server SMS is located and to a bank interface DCB for digital payment orders. The telecommunication network may, by way of preferred example, be a GSM-based system, and will generally include an additional multiplicity of connected mobile stations, such as the second mobile station MSB. The first (and/or second) mobile station may by way of illustrative example be a Nokia 3210 handset which is operable for the sending and receipt of short messages, such as payment orders. Attached to the short message service center is a database DB in which information relating to payment orders is saved or stored. The payment order bank interface DCB comprises a connection to the information system of the bank that enables quick and efficient honoring of payment orders. Honoring of a payment order typically includes the transfer of monetary funds from the sender to the bank account of the intended recipient.

Figure 2:
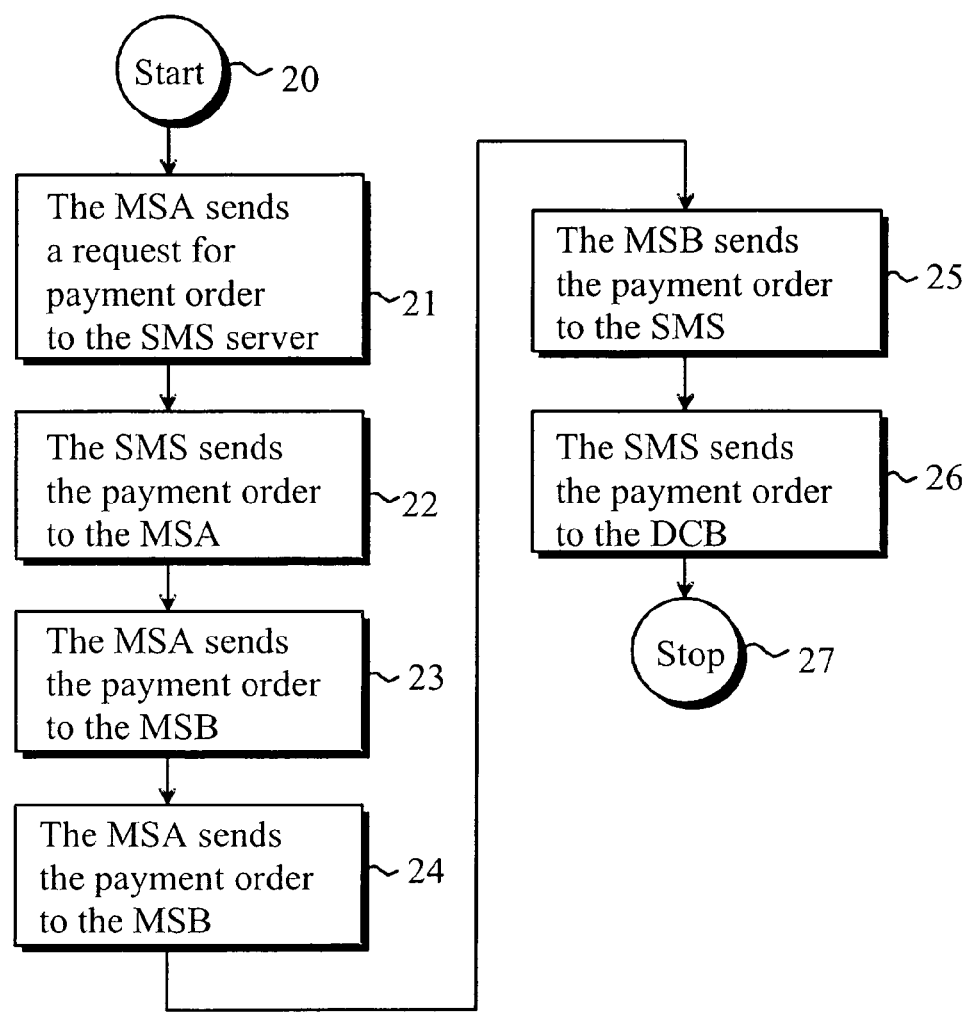
FIG. 2 is a flow chart of a method implementing the invention.

A method implemented in accordance with and illustrating the advantageous functionality of the invention is shown in the flow chart of FIG. 2. The mobile station MSA initially sends a request for a payment order to the payment order server SMS (block 21). The payment order server SMS may by way of typical example be located in the short message center. The payment order server SMS then sends the payment order to the initiating first mobile station MSA which, on its receipt, further transmits the payment order to the second mobile station MSB (blocks 22 and 23). When the second mobile station MSB has received the transmitted payment order, it honors the payment order by sending the payment order to the payment order server SMS (blocks 24 and 25). From the payment order server SMS the payment order is then further transmitted to the payment order bank interface DCB (block 26) to effect or record the final transfer of monetary funds.

FIGS. 3a, 3b and 3c depict the information displayed on the screens of mobile stations in the use of an application implemented in accordance with the invention. The first mobile station display screen of FIG. 3a carries the short message that is used by the first mobile station MSA to order or request a payment order. In response to the delivery of this payment order request from the first mobile station to the payment order server SMS, which in this example is the short message center, the requested payment order is returned to the first mobile station MSA and displayed on the first mobile station screen, as shown in FIG. 3b. The first mobile station MSA then further transmits the payment order to the second mobile station MSB, at which point the mobile number of the sender and instructions for honoring the payment order are attached to the payment order as shown in FIG. 3c. A payment order may by way of illustrative example be employed to make a payment for a vehicle, housing or a weekend auction purchase. Such a payment order may similarly be employed with like ease and efficiency to send a monetary gift to another person or party, such as a secondary school graduate, without requiring that the sender of the gift be present at the graduation or other remote event or location.

One contemplated implementation of the invention utilizes a VRU (Voice Response Unit) based telephone service. When a call is received from a client who has received a payment order, the system is able to immediately identify, by consulting the information stored or recorded in its database, any one or more payment orders that the particular client has received but has not yet honored. Often there will be found to be just one such payment order, in which case the VRU may transmit to the client a message of the form: "Do you wish to honor the payment order received by you? Answer yes (or press 1), or answer no (or press 2)". If on the other hand the system identifies several open payment orders of the client, then those multiple open payment orders may be gathered together and the message transmitted to the client may be of the form: "You have three payment orders not yet honored. Would you like to honor all of these payment orders? Answer yes (or press 1), or answer no (or press 2)".

In another contemplated implementation of the invention, a may client order or request a payment order over the Internet, as for example from a terminal device connected to the Internet. Where the payment order request does not originate from a mobile station, the client must also identify itself in a notifications field. The requested payment order may in such cases be transferred directly to the intended recipient of the payment without first sending it to the terminal device of the requesting sender. Confirmation messages and other status or notification messages and the like, however, may be sent to the mobile station of the sender.

In some implementations of the invention, when a payment order has expired, the sender is informed of the expiration by way of a message. The message informing the sender of the payment order expiration may take the form: "The payment order of 200 EUR sent to you by Teemu the student of technology (GSM 0400 123 456) has expired and has been returned to the sender. Blame yourself, not us. Welcome to us. We are always ready to help you. Best regards, bank".

It is further contemplated that, in some implementations of the invention, the client may be sent a message informing the client that a payment order has been honored, if the system recognizes the client as a regular or repeat user. That message may by way of illustrative example be of the form: "The payment order of 200 EUR was deposited in your account 123456-987654". A similar message confirming honoring of the payment order may also be sent to the recipient: "Tiina the student of technology honored the check of 200 EUR that was sent by you on Oct. 22, 1999 at 6:00 p.m. on Oct. 28, 1999 at 9:25 a.m." Where, on the other hand, the client is a random or first-time user, a conditional message indicating that the payment order has been honored may be sent to the client. Such a conditional message may for example take the form: "The payment order of 200 EUR from Teemu the student of technology will be deposited in your account 123456-987654. If you wish to change the account, please send the new account number as a short message to the number 12345." Honoring of the subject payment order is then delayed subject to a possible change in the account to which the payment is to be deposited and, if no account change notification or request has been received within a predetermined time period, such as two hours, the payment order is then honored and the payment is deposited in the originally-identified account. Should the client instead send or designated a new or changed account number before the predetermined time period has expired, then the payment order is immediately honored by a deposit to the newly-identified account. If the system does not know the account number of the client, the system may in some implementations of the invention send a message to the client requesting the account number. That message may for example be of the form: "A cheque of 200 EUR from Teemu the student of technology will be deposited in your account as soon as you send your account number in a short message to the number 12345 or call 0200 12345." The latter telephone number may for example access a VRU system to which the user may specify the account number by voice-frequency keying or in any other suitable manner. In such cases it is preferred to request that the client repeat the account number twice to be sure that it has been correctly received and understood. The account number is then saved to the system database so that next time the same client will be treated as a regular or repeat user of the system. It is also contemplated that a client may be permitted or able to utilize the VRU menus to change the account number to which payments are normally directed, unless that capability is blocked for security reasons.

A client that frequently utilizes the inventive system may have several accounts recorded in the system. In some implementations different telephone numbers may be attached to or associated with those various accounts to assist the client in choosing or designating to which of the accounts a payment is to be deposited. A copy of a payment order is normally stored in the system files for several months after it has been honored to permit review or reconstruction of transactions as desired or needed by authorities or others.

While there have shown and described and pointed out fundamental novel features of the invention as applied to preferred embodiments and implementations thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment or implementation of the invention may be incorporated in any other disclosed or described or suggested form or embodiment or implementation as a general matter of design choice. It is the intention, therefore, to be limited only as indicated by the scope of the claims appended hereto.

What is claimed is:

1. A method comprising:
    sending a request for a payment order in the form of a short message service (SMS) message from a telecommunication device to a payment order server that is operatively coupled to a bank interface;
    receiving said payment order in the form of a SMS message from said payment order server at said telecommunication device, said payment order carrying with it rights to funds delineated therein upon presentation of said payment order to said bank interface through said payment order server, wherein payment of funds is not conditioned upon further action being executed by said telecommunication device after said telecommunication device sends said payment order to a second telecommunication device; and sending said payment order and instructions for honoring said payment order in the form of a SMS message from said telecommunication device to said second telecommunication device.

2. The method of claim 1 further comprising:
receiving at said telecommunication device a confirmation message from said payment order server prior to receiving said payment order.

3. The method of claim 1 further comprising:
receiving at said telecommunication device an account transaction informational message after receiving said payment order from said payment order server.

4. The method of claim 1 wherein said payment order further comprises a message component selected from the group consisting of:
the amount of currency subject to transfer by the payment order,
a sender identification,
a terminal identifier for said first telecommunication device,
a transmission time,
a number of confirmation messages to be sent,
a period of validity,
a method of destruction if not honored within said period of validity, and
an identifier for a second telecommunication device.

5. A method comprising:
receiving at a second telecommunication device a payment order and instructions for honoring said payment order in the form of a short message service (SMS) message from a first telecommunication device, said payment order stating funds payable and said payment order carrying with it rights to said funds upon presentation of said payment order to a payment order server that is operatively coupled to a bank interface, wherein payment of funds is not conditioned upon further action being executed by said first telecommunication device; and
forwarding from said second telecommunication device said payment order to said payment order server for presentation of said payment order to said bank interface for immediate payment of said funds in accordance with said payment order.

6. The method of claim 5 further comprising:
sending from said second telecommunication device a confirmation message to said first telecommunication device, said message confirming receipt of said payment order.

7. A method for use in a payment order server, the method comprising:
receiving a request for a payment order in the form of a short message service (SMS) message from a first telecommunication device;
communicating with a bank interface to establish said payment order, said payment order carrying with it rights to funds delineated therein upon presentation of said payment order to said bank interface through said payment order server, wherein payment of funds is not conditioned upon further action being executed by said first telecommunication device after said first telecommunication device sends said payment order to a second telecommunication device;
forwarding said payment order in the form of a SMS message to said first telecommunication device;
receiving said payment order in the form of a SMS message from said second telecommunication device; and
presenting said payment order to said back interface for immediate payment of said funds in accordance with said payment order.

8. The method of claim 7 further comprising:
sending from said payment order server to said first telecommunication device a message confirming that the payment order server has honored said payment order received from said second telecommunication device.

9. The method of claim 7 further comprising:
sending from said payment order server to said second telecommunication device a reminder message that said payment order will expire.

10. The method of claim 7 further comprising:
canceling said payment order if said payment order is sent from said second telecommunication device to a third telecommunication device.

11. The method of claim 7 further comprising:
canceling said payment order if said payment order is not submitted to said payment order server to be honored within a predetermined time period.

12. The method of claim 7 further comprising:
sending to said first telecommunication device a message indicating that the payment order is cancelled.

13. The method of claim 7 further comprising:
sending to said second telecommunication device a message indicating that the payment order is cancelled.

14. The method of claim 7 wherein said payment order comprises:
a digital message.

15. A telecommunication device comprising:
a computer-readable memory; and
a processor operatively coupled to said computer-readable memory, said computer-readable memory comprising instructions that, upon execution by said processor, cause said telecommunication device to:
send a request for a payment order in the form of a short message service (SMS) message to a payment order server that is operatively coupled to a bank interface,
receive said payment order in the form of a SMS message from said payment order server, said payment order carrying with it rights to funds delineated therein upon presentation of said payment order to said bank interface server through said payment order server, wherein payment of funds is not conditioned upon further action being executed by said telecommunication device after said telecommunication device sends said payment order to a second telecommunication device; and
send said payment order and instructions for honoring said payment order in the form of a SMS message to said second telecommunication device.

16. The method of claim 1, wherein said request for a payment order comprises a specific amount of currency to be associated with said payment order.

17. The method of claim 7, wherein said request for a payment order comprises a specific amount of currency to be associated with said payment order.

18. The method of claim 1, wherein said payment order server is located within a short message center.

19. The method of claim 7, wherein said payment order server is located within a short message center.

\* \* \* \* \*

UNITED STATES PATENT AND TRADEMARK OFFICE
CERTIFICATE OF CORRECTION

PATENT NO.        : 8,484,128 B2                           Page 1 of 1
APPLICATION NO.   : 10/288091
DATED             : July 9, 2013
INVENTOR(S)       : Vihinen It is certified that error appears in the above-identified patent and that said Letters Patent is hereby corrected as shown below:

On the Title Page, in Column 1, below "Prior Publication Data",
insert -- (62) Related U.S. Application Data
This application is a Con. Of PCT/FI01/00428 filed on May 4, 2001 --.

In the Specification

In Column 3, Lines 13-14, delete "identifies of the" and insert -- identifies the --, therefor.

Signed and Sealed this
Twenty-ninth Day of April, 2014

Michelle K. Lee
*Deputy Director of the United States Patent and Trademark Office*